United States Patent
Raikar et al.

(10) Patent No.: US 12,326,538 B2
(45) Date of Patent: Jun. 10, 2025

(54) DIRECTIONAL PRECIPITATION FLOW RATE MEASUREMENT

(71) Applicant: TORC Robotics, Inc., Blacksburg, VA (US)

(72) Inventors: Akshay Pai Raikar, Blacksburg, VA (US); Joseph Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 200 days.

(21) Appl. No.: 18/222,389

(22) Filed: Jul. 14, 2023

(65) Prior Publication Data

US 2025/0020828 A1 Jan. 16, 2025

(51) Int. Cl.
| | |
|---|---|
| *G01W 1/14* | (2006.01) |
| *B60W 30/14* | (2006.01) |
| *B60W 60/00* | (2020.01) |
| *H05B 3/22* | (2006.01) |

(52) U.S. Cl.
CPC ............ *G01W 1/14* (2013.01); *B60W 30/143* (2013.01); *B60W 60/001* (2020.02); *H05B 3/22* (2013.01); *B60W 2555/20* (2020.02)

(58) Field of Classification Search
CPC .... G01W 1/14; B60W 60/001; B60W 30/143; B60W 2555/20; H05B 3/22
See application file for complete search history.

(56) References Cited

U.S. PATENT DOCUMENTS

| | | | |
|---|---|---|---|
| 3,990,307 A | 11/1976 | Guidicelli | |
| 9,110,196 B2 | 8/2015 | Urmson | |
| 11,262,762 B2 | 3/2022 | Han | |
| 2015/0203107 A1 | 7/2015 | Lippman | |
| 2017/0225658 A1* | 8/2017 | Quintero Perez | B60L 1/003 |
| 2023/0182742 A1* | 6/2023 | Han | B60W 40/02 |
| | | | 701/23 |
| 2023/0331585 A1* | 10/2023 | Williams | C02F 1/008 |
| 2024/0132116 A1* | 4/2024 | Kawashima | B60W 50/14 |

* cited by examiner

*Primary Examiner* — Jess Whittington
*Assistant Examiner* — Rami Nabih Bedewi
(74) *Attorney, Agent, or Firm* — Armstrong Teasdale LLP (57) ABSTRACT

Aspects of this technical solution can include determining, by one or more processors of a liquid collection system and based on respective amounts of liquid detected by a plurality of sensors and a velocity of a vehicle, a direction of movement of the liquid. The plurality of sensors can each be associated with respective ones of a plurality of receptacles. The plurality of sensors can be configured to detect respective amounts of liquid collected by respective openings of each of the plurality of receptacles associated with corresponding directions of movement of a liquid. The plurality of receptacles can be configured to collect at least a portion of the liquid via the respective openings.

20 Claims, 8 Drawing Sheets

DIRECTIONAL PRECIPITATION FLOW RATE MEASUREMENT

TECHNICAL FIELD

The present implementations relate generally to precipitation measurement and, more specifically, to systems and methods for directional precipitation flow rate measurement.

BACKGROUND

As technology improves, consumer demand for more refined weather measurement systems increases. Conventional systems have limited means of measuring various weather events.

SUMMARY

This technical solution is directed at least to systems and methods for directional precipitation flow rate measurement. For example, this technical solution can include multiple receptacles, each with a respective sensor, located on a vehicle, a structure, or other object located outside (e.g., in an open-air space). Each receptacle can have respective openings that are associated with corresponding directions. For example, the openings may cover a respective range of angles such that each angle within 360° is covered by at least one of the openings. The sensors may be configured to detect amounts of liquid collected by the respective openings. Thus, a technical solution for directional precipitation flow rate measurement is provided. This technical solution can provide at least the technical improvement of improved determination of flow rate of the liquid associated with a direction (e.g., a vector flow rate), patterns of movement of the liquid, and how the liquid may affect conditions (e.g., driving, navigating, etc.) for moving objects. For example, this technical solution can provide a technical improvement of detection to and reaction by a vehicle to rainfall while driving along a road, beyond the capability of a manual process to detect and process concurrently in a compressed time frame corresponding to fractions of a second as required for effective steering and navigation of motor vehicles.

At least one aspect is directed to a liquid collection system. The liquid collection system can include a plurality of receptacles each having respective openings associated with corresponding directions of movement of a liquid, the plurality of receptacles configured to collect at least a portion of the liquid via the respective openings, a plurality of sensors each associated with respective ones of the plurality of receptacles and configured to detect respective amounts of the liquid collected by the respective openings, and one or more processors coupled. The one or more processors can be configured to determine, based on the respective amounts of liquid detected by the plurality of sensors and a velocity of a vehicle, a direction of movement of the liquid, and cause, based on the direction of movement of the liquid, the vehicle to modify the velocity.

At least one aspect is directed to a method for a liquid collection system. The method can include determining, by one or more processors based on respective amounts of liquid detected by a plurality of sensors and a velocity of a vehicle, a direction of movement of the liquid. The method can include causing, by one or more processors based on the direction of movement of the liquid, the vehicle to modify the velocity, wherein the liquid collection system comprises a plurality of receptacles each having respective opening associated with corresponding directions of movement of the liquid, the plurality of receptacles configured to collect at least a portion of the liquid via the respective openings, and the plurality of sensors each associated with respective ones of the plurality of receptacles and configured to detect respective amounts of the liquid collected by the respective openings.

At least one aspect is directed to an autonomous vehicle. The autonomous vehicle can include a plurality of receptacles each having respective openings associated with corresponding directions of movement of a liquid, the plurality of receptacles configured to collect at least a portion of the liquid via the respective openings, a plurality of sensors each associated with respective ones of the plurality of receptacles and configured to detect respective amounts of the liquid collected by the respective openings, and one or more processors. The one or more processors can be configured to monitor, using the plurality of sensors, the liquid while the autonomous vehicle is driving. The one or more processors can be configured to determine, based on the respective amounts of liquid detected by the plurality of sensors and a velocity of the autonomous vehicle, a direction of movement of the liquid, and cause, based on the direction of movement of the liquid, the autonomous vehicle to modify the velocity.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

Vehicles traveling along a roadway may measure an amount of precipitation as a scalar quantity. The vehicles may utilize the scalar quantity to make basic determinations about a state of the roadway, such as whether the roadway is slick or not based on the amount of rainfall detected. However, measuring precipitation as a scalar quantity limits the ability of the vehicles to determine a flow rate (e.g., a true flow rate) of the precipitation. Additionally, attempting to calculate the flow rate while the vehicle is moving at speed provides further difficulties. Correct measurements of flow rate are important for assessing road conditions for vehicle operation due to driving conditions and legal restrictions for autonomous vehicles.

Aspects discussed herein provide for determining the flow rate (e.g., a flow rate vector). In an embodiment, a liquid collection system can include multiple receptacles. Each of the receptacles can have respective openings associated with corresponding directions (e.g., a range of angles) of movement of a liquid. The receptacles can collect liquid via the openings and funnel the liquid towards a liquid measurement system.

The liquid measurement system may be an electronic sensor (e.g., a high precision flow rate sensor) that measures and reports a flow rate of liquid detected by the electronic sensor. For example, the liquid measurement system may measure a flow rate of liquid passing through an opening. Based on the size of the opening and the rate of liquid flowing through the opening, the liquid measurement system may determine an amount of liquid over time (e.g., flow rate). However, other forms electronic devices configured to determine a flow rate for liquid are contemplated. The liquid collection system can communicate with the liquid measurement system to determine respective flow rates detected by the liquid measurement system (e.g., the sensors of the system). The liquid collection system can determine, based on the respective flow rates and a velocity (e.g., of a vehicle coupled with the liquid collection system), a flow rate vector of the measured liquid. In some embodiments, the liquid collection system can communicate with the vehicle (e.g., a controller of the vehicle, one or more processors of the vehicle) to control the vehicle (e.g., cause the vehicle) to perform a navigational action (e.g., modify a velocity associated with a current state of the vehicle) based on the flow rate vector of the liquid.

Figure 1:
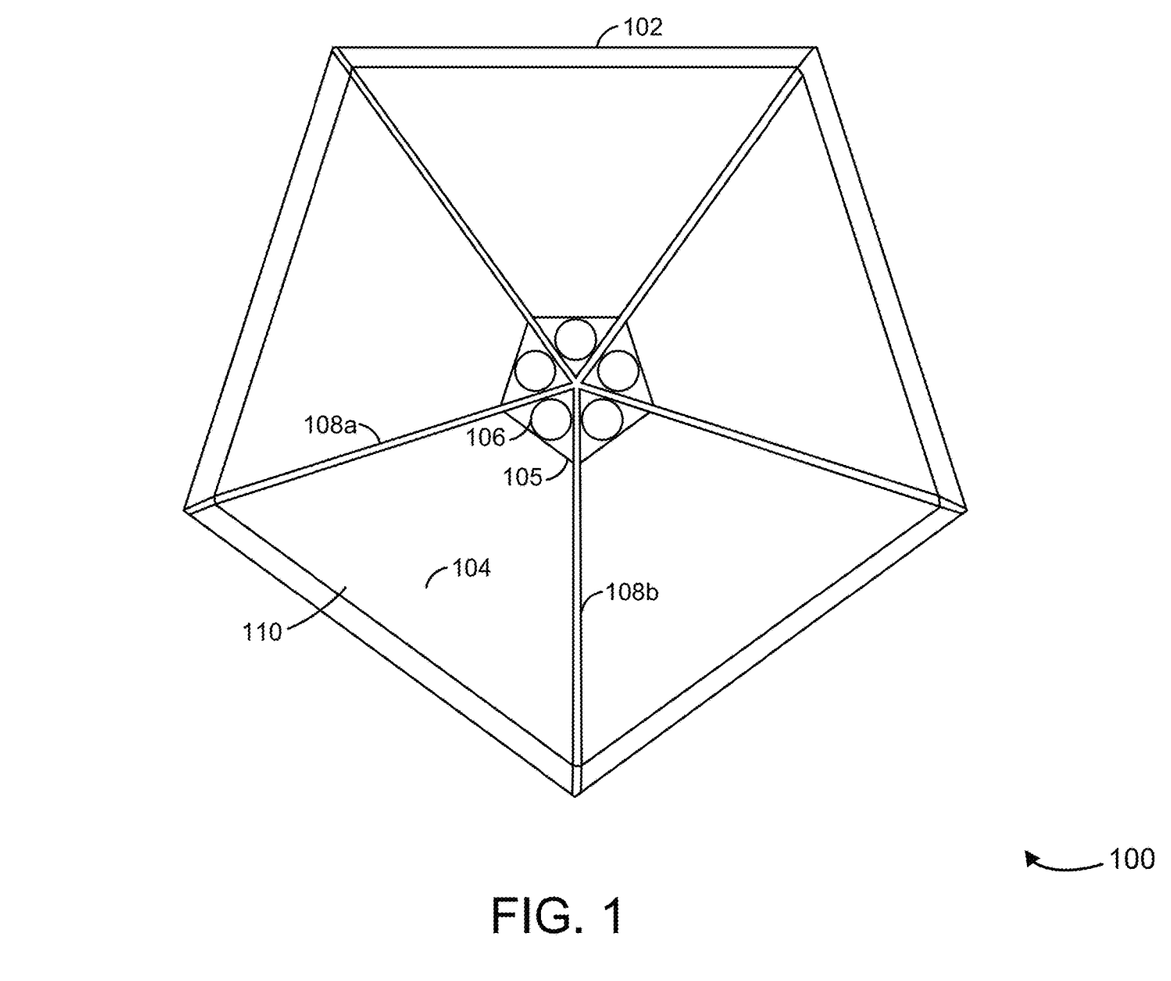
FIGS. 1-4 are schematic diagrams of a liquid collection system that supports directional precipitation flow rate measurement, according to an embodiment.

FIG. 1 is a schematic diagram 100 of a top view of a liquid collection system 102 that supports directional precipitation flow rate measurement, according to one embodiment. The liquid collection system 102 may include one or more receptacles 104, collectors 105, and sensors 106. Each receptacle 104 may include at least a first wall 108a and a second wall 108b and a respective sensor 106. The sensors 106 may include or be the same as or similar to the liquid measurement system 212, as described herein with reference to FIG. 2. The FIGS. 1-4 include an example embodiment of the systems as described herein, other potential embodiments are possible and contemplated (e.g., various configurations of number and angles of receptacles 104). Additionally, the liquid collection system 102 is not confined to the components described herein and may include additional or other components, not shown for brevity, which are to be considered within the scope of the embodiments described herein.

The liquid collection system 102 may be structured according to multiple shapes. In the example of FIGS. 1-4, the liquid collection system 102 can include a hendecahedron structure such that each receptacle 104 is configured to be pentahedrons. The pentahedron may include three solid surfaces (e.g., including the walls 108a and 108b) and an opening 110. Each pentahedron includes a respective sensor 106 located at a corner opposite (e.g., facing) the opening 110 of the receptacle 104. In some embodiments, each receptacle 104 can collect a portion of liquid. For example, liquid may enter the receptacle 104 via the opening 110 and be funneled (e.g., due to the structure of the receptacles 104 and gravity) towards the sensors 106. For example, the inner surfaces of each receptacle 104 may be configured to be pseudo-conical receptacles. The inner surfaces of each receptacle 104 can be hydrophobic (e.g., to collect most or all of the liquid that enters the receptacle 104) with slanted surfaces such that the liquid may move (e.g., be funneled) towards the collectors 105 and then the sensors 106. Each of the sensors 106 can determine (e.g., calculate) an amount of liquid (e.g., a flow rate) that enters the collectors 105.

The walls 108a and 108b can bound the opening 110 such that the opening 110 can cover an arc. For example, each opening 110 may cover an angle. In the example of FIG. 1, each opening may cover 72°, such that the liquid collection system 102 can have five openings 110 to cover a 160° range. The openings 110 may face upwards (e.g., away from the sensors, away from a base of the liquid collection system 102). The openings 110 may be of predetermined sizes (e.g., equal sizes, different sizes such that each opening 110 covers a respective range of degrees different from at least one other opening 110). The liquid collection system 102 may associate each angular sector with a flow rate. The liquid collection system 102 may be configured to determine the direction of movement from a set of flow rates, where the set includes a number of flow rates equal to a number of openings 110 (e.g., a set of five directions). In some embodiments, the openings 110 may be dynamic openings such that the range of degrees for each opening 110 can be altered (e.g., ratio of cone areas are altered) to accommodate different types of measurement conditions (e.g., areas where wind always blows from one direction).

Figure 2:
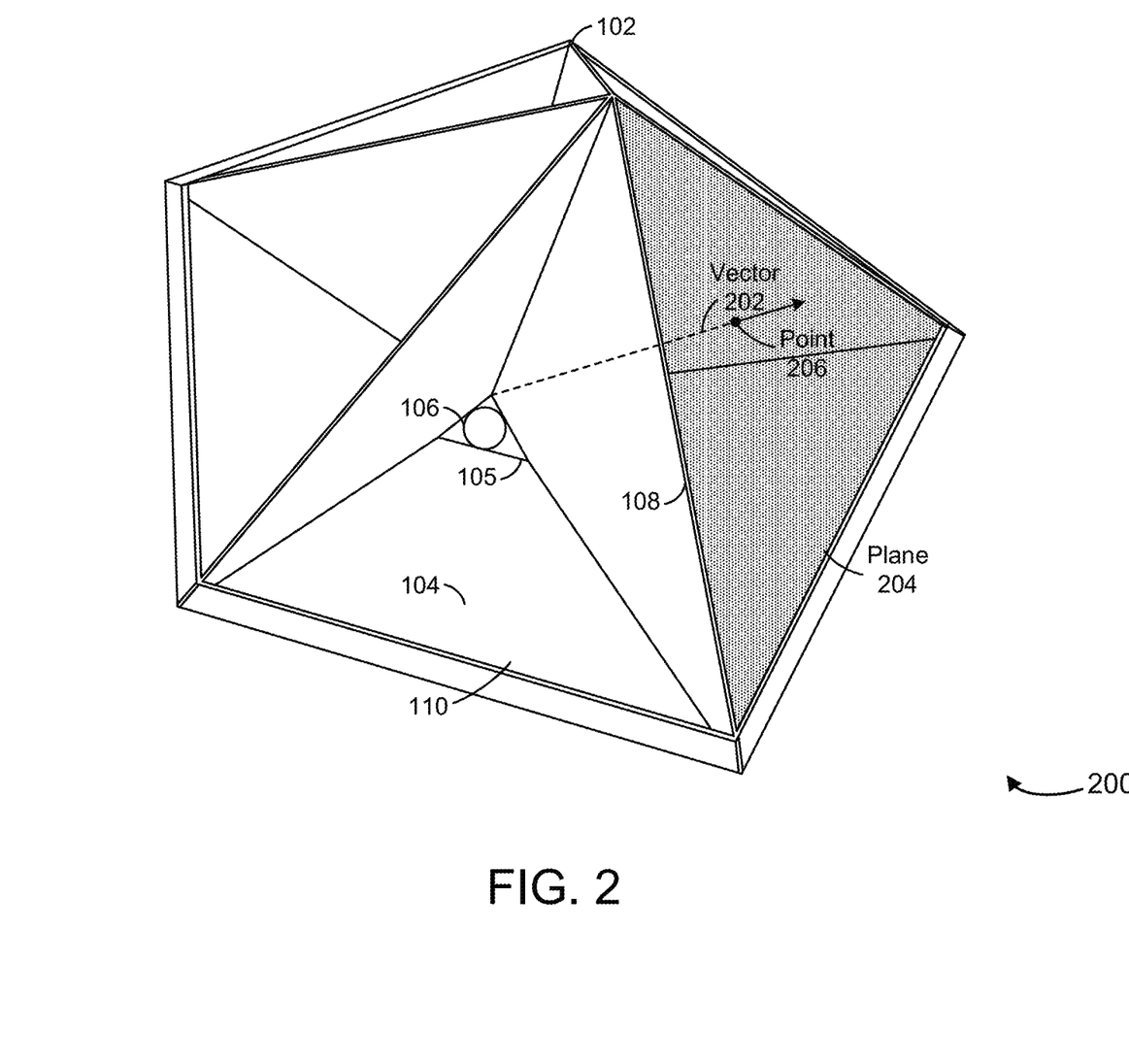

FIG. 2 is a schematic diagram 200 of a view of the liquid collection system 102 that supports directional precipitation flow rate measurement, according to one embodiment. In some embodiments, the liquid collection system 102 may be located on a surface of a moving system. For example, the liquid collection system 102 may be located on a vehicle (e.g., an autonomous vehicle, a truck, a train, a boat) or any system that relies on local meteorological data (e.g., ground stations). The direction of the openings 110 in relation to the vehicle may be known (e.g., fixed such that a first corner of the hendecahedron is pointed in a same direction as a front of the vehicle).

In some embodiments, the vehicle may be moving at a known velocity and include a computer (e.g., an autonomy system, one or more processors). The computer can obtain output from at least one of the sensors 106 indicating an amount of liquid collected by the respective collector 105 in the respective direction of the opening 110. For example, a collector 105 may collect an amount of liquid (e.g., at some rate, varying over time) from a receptacle 104. The sensor 106 may detect (e.g., measure, calculate) the amount of liquid and send an output indicating a flow rate of liquid (e.g., liquid data, a number) to the computer.

The computer can compute (determine, calculate) a three-dimensional (3D) flow rate vector 202 based on the indication of the flow rate of liquid, the known velocity of the vehicle, and the known direction of the opening 110 of the receptacle 104. For example, the computer can compensate for velocity-induced measurement bias based on an angle of incidence of the measurement surface (e.g., the measurement surface may not be normal to the angle of incidence due to the movement of the vehicle). The flow rate vector 202 may be a number associated with a direction that crosses a plane 204 (e.g., a plane formed by the opening 110) at a point 206 in relation to the collector 105 (e.g., the direction may point in the direction from the collector 105 to the cross section of the plane 204 at the point 206). By computing the flow rate vector 202, the computer (of the vehicle) can compensate for vehicle velocity to produce an accurate measurement of local precipitation flux.

Figure 3:
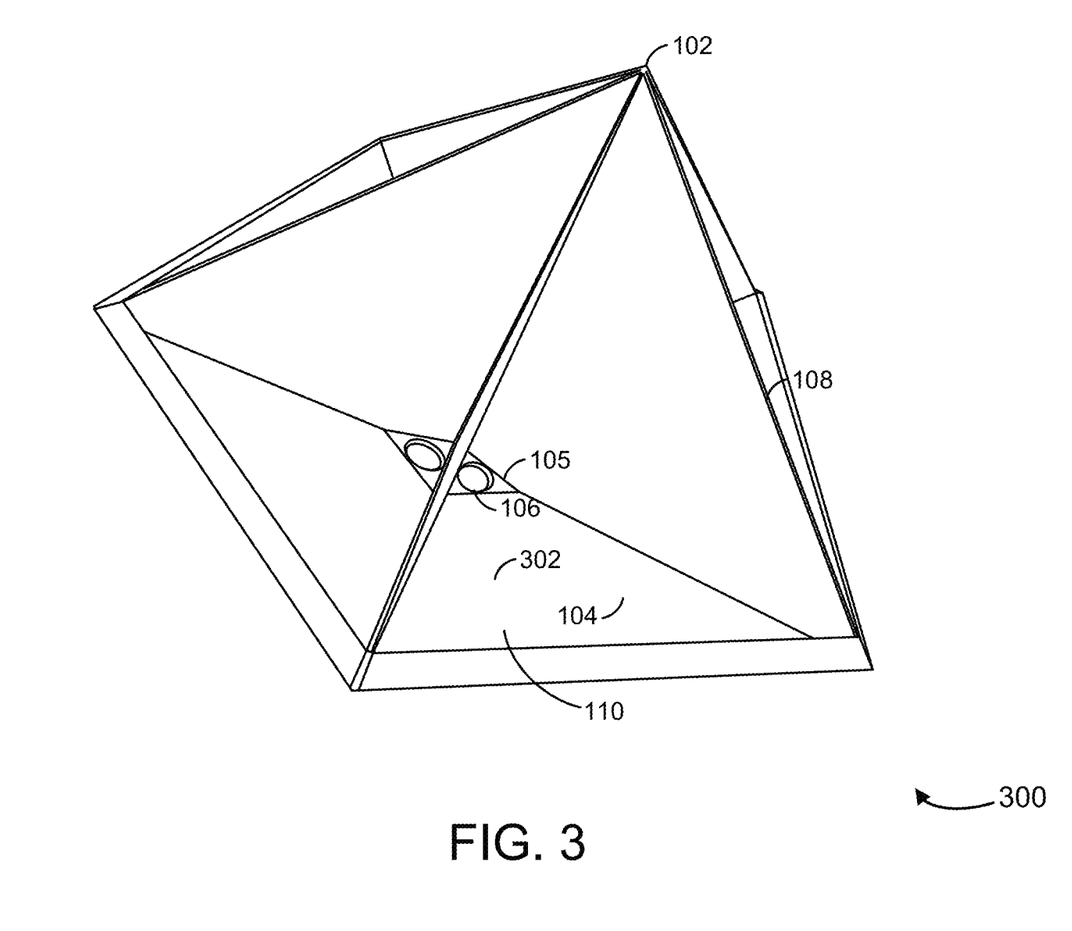

FIG. 3 is a schematic diagram 300 of a view of the liquid collection system 102 that supports directional precipitation flow rate measurement, according to one embodiment. In some embodiments, the liquid collection system 102 may collect liquid. For example, each receptacle 104 can collect at least a portion of the liquid by directing the liquid that enters the collection system 102 to the collectors 105 via the opening 110. The surfaces of each of the walls 108 and a floor 302 of the receptacle 104 may be hydrophobic and slanted towards the collector 105. For example, rain may fall into the receptacle 104 through the opening 110. Due to the hydrophobic material and slanted orientation of each surface, the rain may move towards the collector 105. The collector 105 may funnel the rain into the sensor 106. The sensor 106 may detect a rate at which rain has entered the collector 105. Based on the respective amounts of liquid that flows through each collector 105, the liquid collection system can determine a flow rate of the liquid and a flow rate vector).

Figure 4:
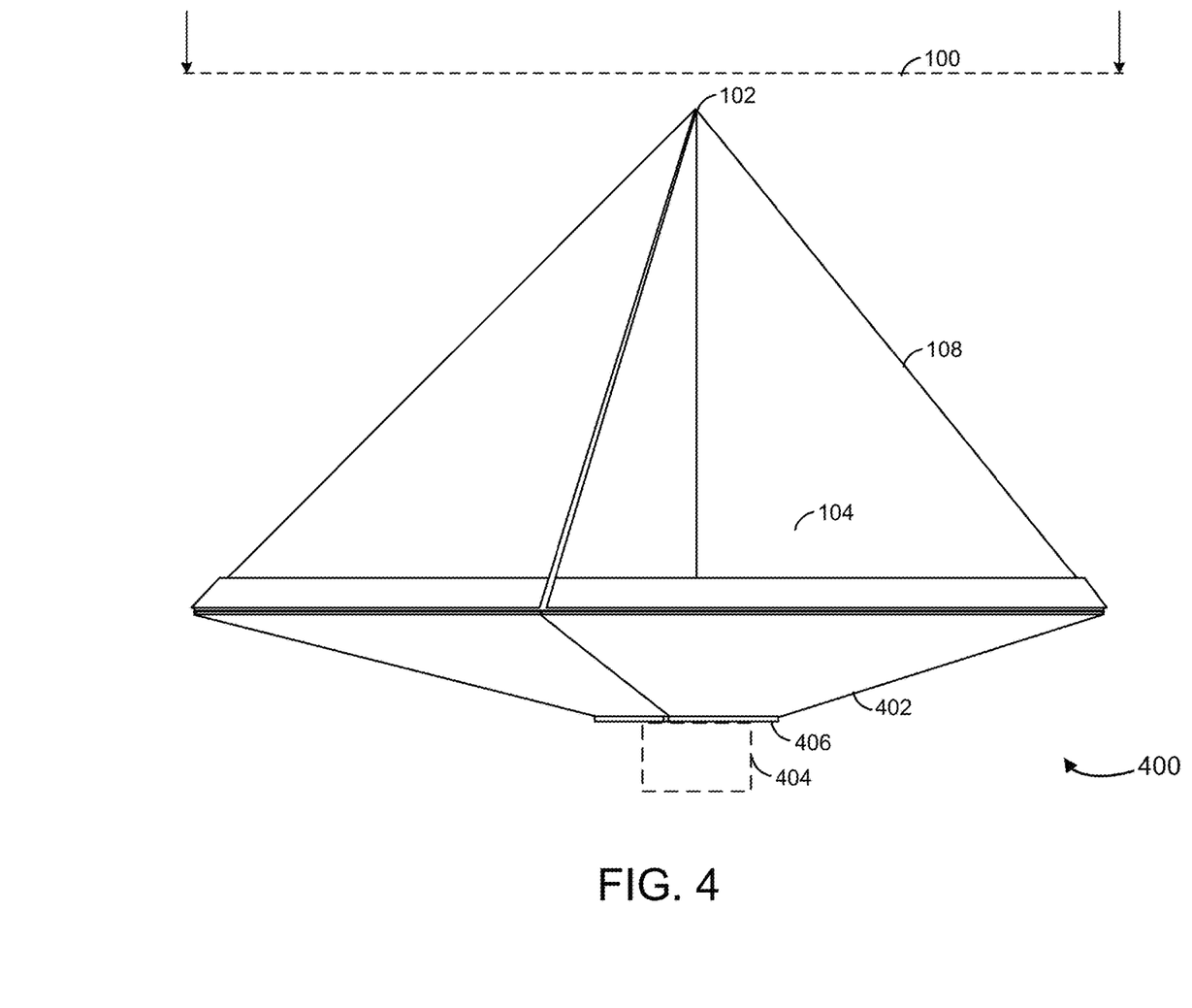

FIG. 4 is a schematic diagram 400 of a side view of the liquid collection system 102 that supports directional precipitation flow rate measurement, according to one embodiment. The liquid collection system 102 may include a lower portion 402. The lower portion 402 may include one or more components (e.g., fasteners, adhesive material, etc.) to support affixing the liquid collection system 102 to an object (e.g., a vehicle, a boat, a ground station). The lower portion 402 may include a base 406 (e.g., a base plate that is thermally conductive) coupled with a heating element 404 (e.g., an electronic heating device). For example, for each receptacle 104, the lower portion 402 may include a respective heating element 404 below the receptacle 104. The heating element 404 may increase a temperature of the receptacle 404 (and the surrounding environment of the receptacle 404). The temperature may be a temperature above a freezing temperature (e.g., above 32° Fahrenheit for water). For example, the liquid collection system 102 may be located in a cold environment with snow, ice, or hail. To detect an amount of liquid in the cold environment and a direction of movement of the liquid, the heating elements 404 may melt the snow, ice, or hail to liquid form. In some embodiments, the walls 108 (e.g., sides of the receptacle 104) can act as cooling elements for the heating elements 404, dissipating energy into the incident precipitation. In some embodiments, the lower portion 402 may include one heating element 404 for all of the receptacles 104.

Figure 5:
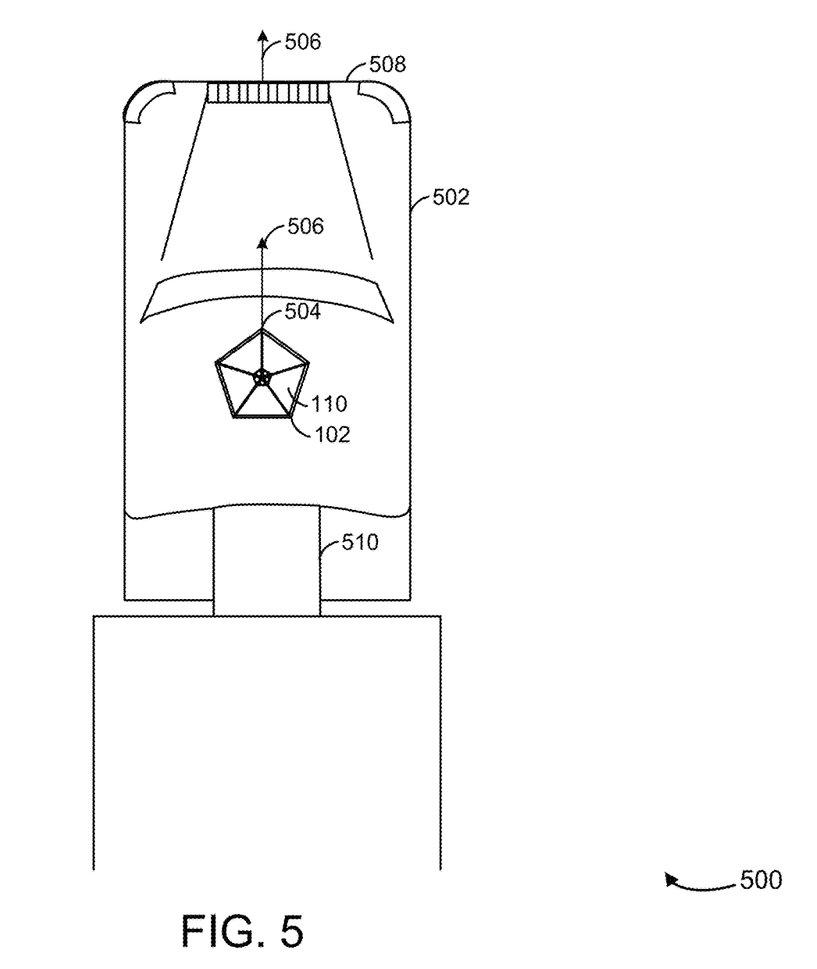
FIG. 5 is a schematic diagram of the vehicle including the liquid collection system that supports directional precipitation flow rate measurement, according to an embodiment.

FIG. 5 is a schematic diagram of a vehicle 502 (e.g., an autonomous vehicle, a truck, a boat, etc.) including the liquid collection system 102, according to various embodiments. In the example of FIG. 5, the liquid collection system 102 may be located on a top portion of the vehicle 502. For example, a first corner 504 of the liquid collection system 102 may be directed (e.g., pointed) towards a same direction 506 as a front 508 of the vehicle 502. The liquid collection system 102 may be oriented on the vehicle 502 such that each opening 110 of the liquid collection system 102 is directed towards an upward angle.

In some embodiments, the vehicle 502 can include an autonomy system 510. The autonomy system 510 may include a GNSS receiver to determine a location of the vehicle 502 via GNSS data and a doppler velocity measured from a carrier wave. The autonomy system 510 may include an inertial measurement unit (IMU) to measure one or more features regarding the motion of the vehicle 502 (e.g., linear acceleration and angular velocity). The autonomy system 510 may include a transceiver to communicate with external networks via a wired or wireless connection and to determine position and velocity data in a global reference frame. The autonomy system 510 may include a processor. For example, the processor may be embodied as one or more of a data processor, a microcontroller, a microprocessor, a digital signal processor, a logic circuit, a programmable logic array, or one or more other devices for controlling the autonomy system 510 in response to one or more of the system inputs. Autonomy system 510 may include a single microprocessor or multiple microprocessors Numerous commercially available microprocessors can be configured to perform the functions of the autonomy system 510. It should be appreciated that autonomy system 510 could include a general machine controller capable of controlling numerous other machine functions. Alternatively, a special-purpose machine controller could be provided. Further, the autonomy system 510, or portions thereof, may be located remote from the autonomy system 510. The autonomy system 510 may include memory to store data and/or software routines that may assist the autonomy system 510 in performing its functions. Various other known circuits may be associated with the autonomy system 510, including signal-conditioning circuitry, communication circuitry, actuation circuitry, and other appropriate circuitry.

Figure 6A:
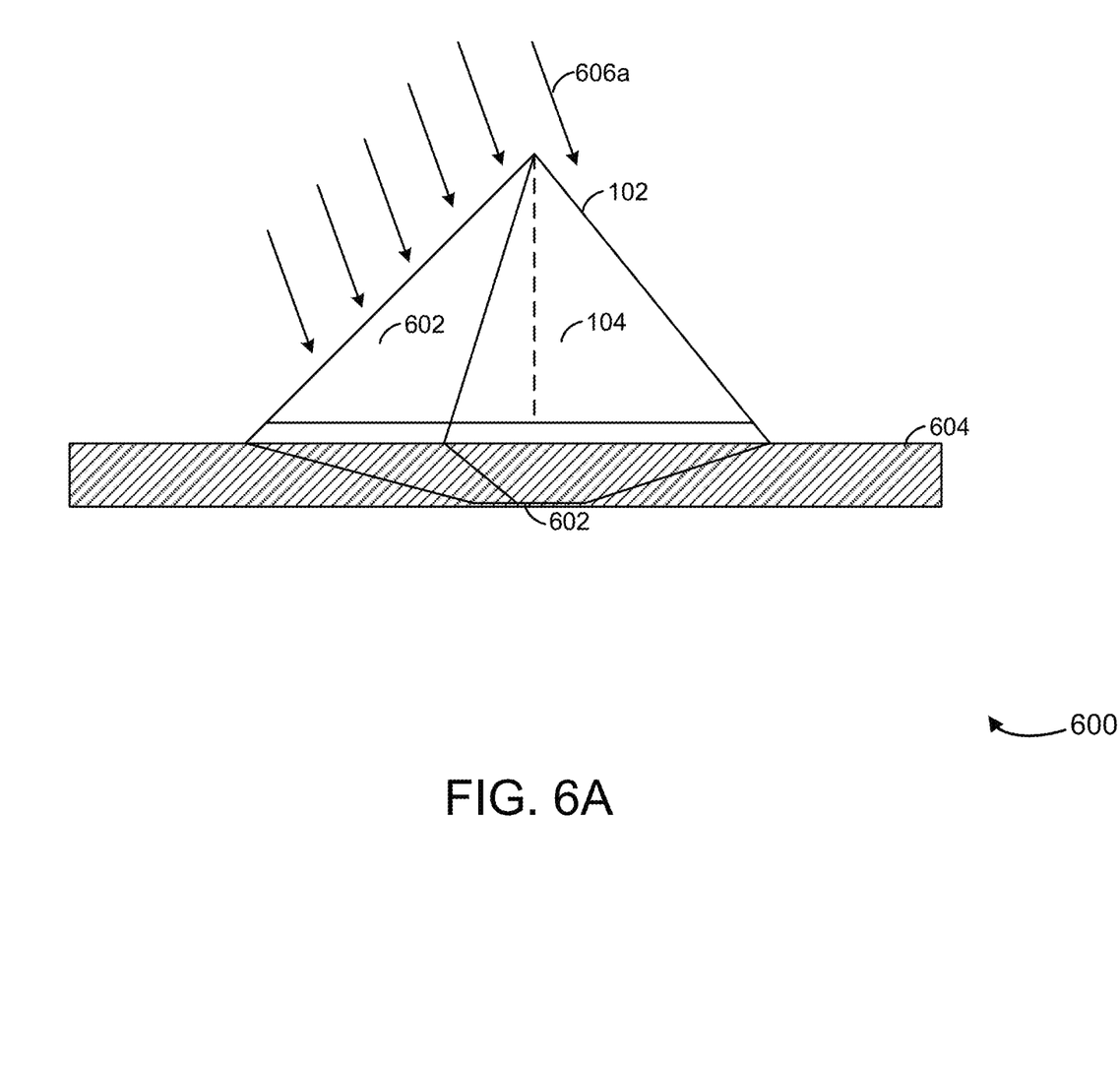
FIGS. 6A-B depict example environments using the liquid collection system for directional precipitation flow rate measurement, in accordance with present implementations.
Figure 6B:
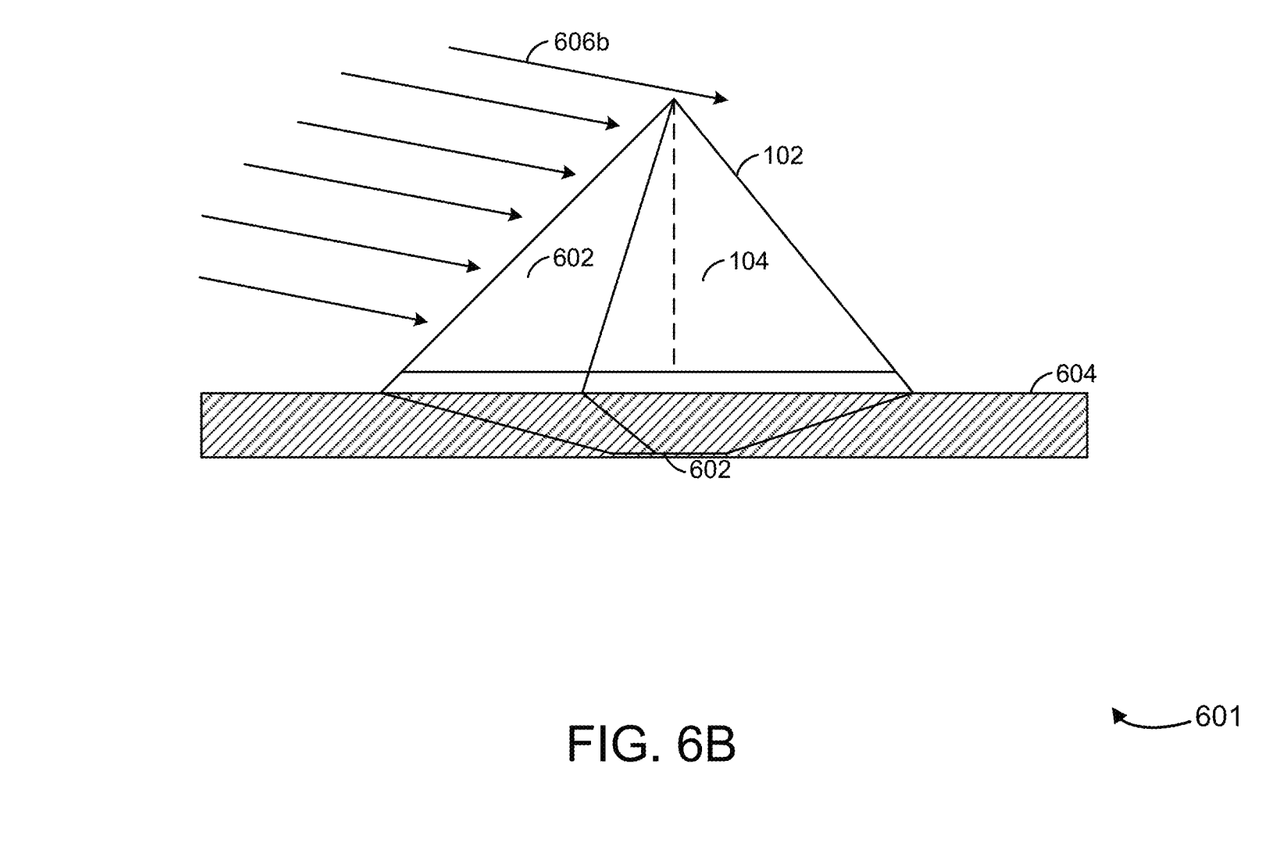

FIGS. 6A and 6B depict example environments 600 using the liquid collection system 102 for directional precipitation flow rate measurement, according to an embodiment. The liquid collection system 102 can be located on (e.g., attached to) an object 604 (e.g., a vehicle, a ground station). For example, the lower portion 602 of the liquid collection system 102 can be embedded in (e.g., affixed to) a portion of the object 604.

In the example of FIG. 6A, rainfall 606a may fall onto the liquid collection system 102. The liquid collection system 102 may collect portions of the rainfall 606a in a first receptacle 104 and a second receptacle 602. Due to the angle of the rainfall 606a, a velocity of the object 604 while the object 604 is moving, or other environmental conditions (e.g., wind), an amount of the rainfall 606a collected by the second receptacle 602 may be greater than an amount of the rainfall 606a collected by the first receptacle 104. For example, the object 604 may be an autonomous vehicle (e.g., truck 102, truck 200) with the liquid collection system 102 located on top of the autonomous vehicle. The autonomous vehicle may be driving along a roadway while rain is falling towards the autonomous vehicle. Due to the angle of the rainfall 606a (e.g., coming from behind the autonomous vehicle) the amount of the rainfall 606a collected by the second receptacle 602 (e.g., directed towards the back of the autonomous vehicle) may be greater than the amount of the rainfall 606a collected by the first receptacle 104. Based on the respective amounts of rainfall collected, the velocity of the autonomous vehicle, and other limiting factors (e.g., wind speed, wind direction), the liquid collection system 102 may determine a direction of movement of the rainfall 606a (e.g., a flow rate vector corresponding to the rainfall 606a).

In the example of FIG. 6B, rainfall 606b may fall onto the liquid collection system 102. The angle of the rainfall 606b may be a different angle to the angle of the rainfall 606a. For example, the rainfall 606b may be coming towards the autonomous vehicle from a more acute angle such that the receptacle 104 does not collect any of the rainfall 606b (e.g., stays dry, collects only a small portion of the rainfall 606b). Based on the respective amounts of rainfall collected, the velocity of the autonomous vehicle, and other limiting factors (e.g., wind speed, wind direction), the liquid collection system 102 may determine a direction of movement of the rainfall 606b (e.g., a flow rate vector corresponding to the rainfall 606b). Based on the different flow rate vectors calculated in the example of FIGS. 6A and 6B, the autonomous vehicle may perform different navigational actions. For example, the autonomous vehicle may adjust a velocity of the autonomous vehicle by a first amount based on the first flow rate vector and adjust the velocity by a second amount based on the second flow rate vector, among other actions (e.g., adjust various internal calibrations to account for variable traction on a surface of a roadway based on the different flow rate vectors).

Figure 7:
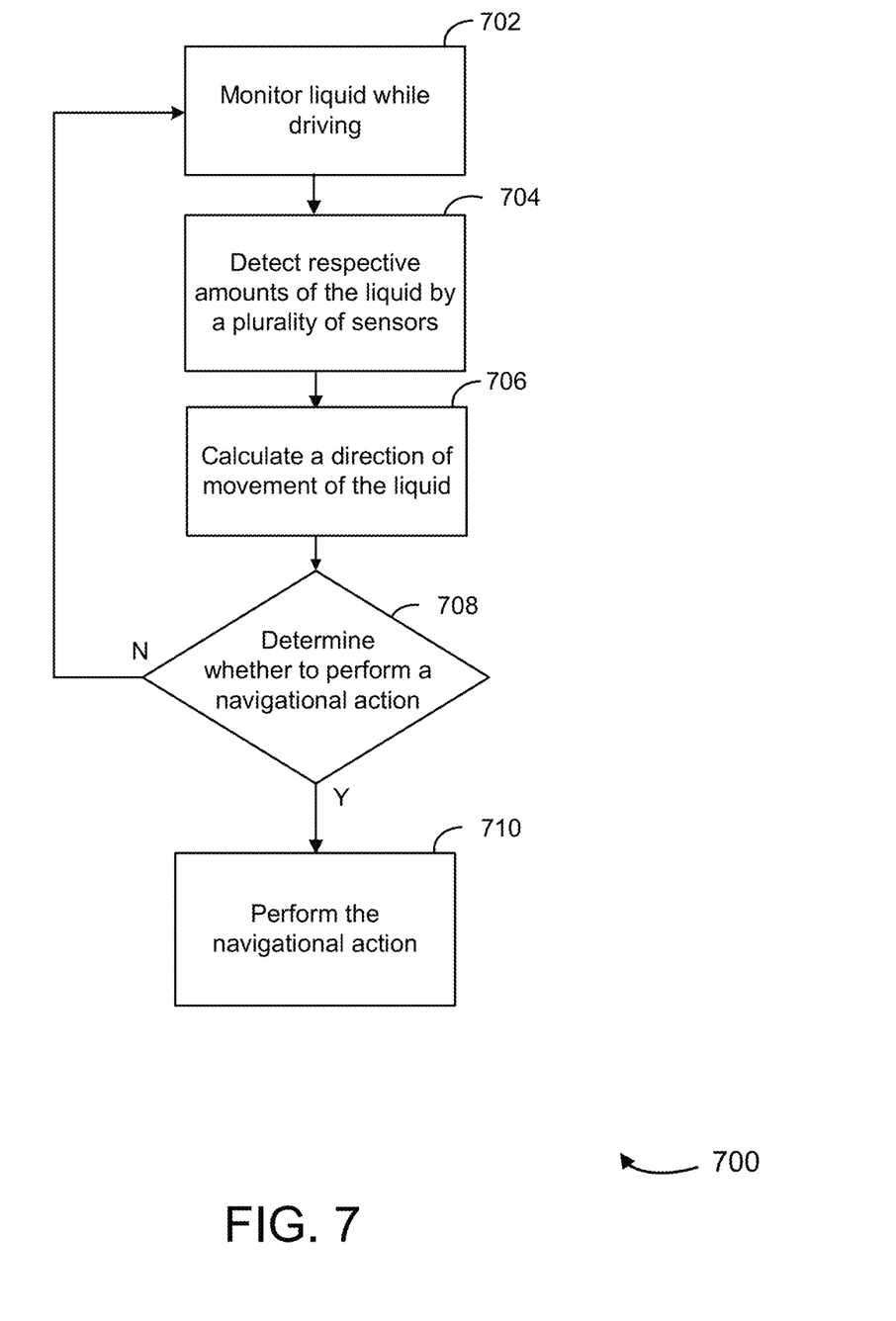
FIG. 7 depicts an example method of directional precipitation flow rate measurement, in accordance with present implementations.

FIG. 7 depicts an example method 700 of directional precipitation flow rate measurement, in accordance with present implementations. FIG. 7 shows execution steps of a processor-based method using the system 250 or 102, according to some embodiments. The method 700 shown in FIG. 7 comprises execution steps 702-710. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously. The method 700 is described as being performed by a data processing system stored on or otherwise located at an autonomous vehicle, such as the trucks 102 and 200 depicted in FIGS. 1-2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle. In some embodiments another type of moving vehicle (e.g., non-autonomous, boat, truck, ground station) may include one or more processors that support execution of the method 700.

At 702, the data processing system monitors multiple liquid flow rates. In some cases, the data processing system can monitor the liquid while a vehicle including the data processing system is moving (e.g., driving). The data processing system can be communicatively coupled with a plurality of sensors each associated with respective ones of a plurality of receptacles and configured to detect respective amounts of the liquid collected by respective openings of the plurality of receptacles. For example, the plurality of receptacles each have respective openings associated with corresponding directions of movement of the liquid, the plurality of receptacles configured to collect at least a portion of the liquid via the respective openings.

At 704, the data processing system detects respective flow rates of the liquid by the plurality of sensors. At 706, the data processing system determines (e.g., calculates) a direction of movement of the liquid based on the respective amounts of the liquid detected and a velocity of the vehicle. At 708, the data processing system determines whether to perform a navigational action based on the direction of movement of the liquid. For example, the data processing system may determine a rainfall pattern or a condition of a surface (e.g., a roadway surface) and determine to modify a velocity of the vehicle based on the determination of the rainfall pattern or the condition of the surface. At 710, the data processing system performs the navigational action. For example, the data processing system can cause the vehicle to modify the velocity of the vehicle based on the direction of movement of the liquid.

The method 700 can include calculating a flow rate vector based on the respective flow rates (e.g., scalar flow rates) detected by the plurality of sensors and the velocity of the vehicle, wherein causing the vehicle to modify the velocity is based on the flow rate vector. The method 700 can include monitoring, using the plurality of sensors, the liquid during movement of the vehicle, wherein determining the direction of movement of the liquid is based on the monitoring. In some embodiments, the directions of movement of the liquid are flow rate vectors. In some embodiments, the vehicle further comprises one or more heating elements configured to provide heat to the plurality of receptacles. In some embodiments, each of the plurality of receptacles are oriented to an angle of incidence to compensate for measurement bias. In some embodiments, the plurality of receptacles comprises respective sloped surfaces to direct the liquid to the sensors. In some embodiments, the plurality of receptacles is configured to be pseudo-cones of equal area triangles. In some embodiments, the liquid is rain. In some embodiments, the plurality of receptacles comprises five receptacles each having respective openings associated with five different directions of movement of the liquid.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A liquid collection system, comprising:
   a plurality of receptacles each having respective openings associated with corresponding directions of movement of a liquid, the plurality of receptacles configured to collect at least a portion of the liquid via the respective openings;
   a plurality of sensors each associated with respective ones of the plurality of receptacles and configured to detect respective amounts of the liquid collected by the respective openings; and
   one or more processors configured to:
     determine, based on the respective amounts of liquid detected by the plurality of sensors and a velocity of a vehicle, a direction of movement of the liquid, and cause, based on the direction of movement of the liquid, the vehicle to modify the velocity.

2. The liquid collection system of claim 1, wherein the one or more processors are configured to determine the direction of movement of the liquid by:
   calculating a flow rate vector based on the respective amounts of liquid detected by the plurality of sensors and the velocity of the vehicle, wherein causing the vehicle to modify the velocity is based on the flow rate vector.

3. The liquid collection system of claim 1, wherein the one or more processors are configured to:
   monitor, using the plurality of sensors, the liquid during movement of the vehicle, wherein determining the direction of movement of the liquid is based on the monitoring.

4. The liquid collection system of claim 1, wherein the directions of movement of the liquid are flow rate vectors.

5. The liquid collection system of claim 1, wherein the vehicle further comprises one or more heating elements configured to provide heat to the plurality of receptacles.

6. The liquid collection system of claim 1, wherein each of the plurality of receptacles are oriented to an angle of incidence to compensate for measurement bias.

7. The liquid collection system of claim 1, wherein the plurality of receptacles comprises respective sloped surfaces to direct the liquid to the sensors.

8. The liquid collection system of claim 1, wherein the plurality of receptacles is configured to be pseudo-cones of equal area triangles.

9. The liquid collection system of claim 1, wherein the liquid is rain.

10. The liquid collection system of claim 1, wherein the plurality of receptacles comprises five receptacles each having respective openings associated with five different directions of movement of the liquid.

11. A method for a liquid collection system, comprising:
   determining, based on respective amounts of liquid detected by a plurality of sensors and a velocity of a vehicle, a direction of movement of the liquid; and
   causing, based on the direction of movement of the liquid, the vehicle to modify the velocity, wherein the liquid collection system comprises a plurality of receptacles each having respective opening associated with corresponding directions of movement of the liquid, the plurality of receptacles configured to collect at least a portion of the liquid via the respective openings, and the plurality of sensors each associated with respective ones of the plurality of receptacles and configured to detect respective amounts of the liquid collected by the respective openings.

12. The method of claim 11, wherein determining the direction of movement of the liquid comprises:
   calculating a flow rate vector based on the respective amounts of liquid detected by the plurality of sensors and the velocity of the vehicle, wherein causing the vehicle to modify the velocity is based on the flow rate vector.

13. The method of claim 11, further comprising:
   monitoring, using the plurality of sensors, the liquid during movement of the vehicle, wherein determining the direction of movement of the liquid is based on the monitoring.

14. The method of claim 11, wherein the directions of movement of the liquid are flow rate vectors.

15. The method of claim 11, wherein the vehicle further comprises one or more heating elements configured to provide heat to the plurality of receptacles.

16. The method of claim 11, wherein each of the plurality of receptacles are oriented to an angle of incidence to compensate for measurement bias.

17. An autonomous vehicle, comprising:
   a plurality of receptacles each having respective openings associated with corresponding directions of movement of a liquid, the plurality of receptacles configured to collect at least a portion of the liquid via the respective openings;
   a plurality of sensors each associated with respective ones of the plurality of receptacles and configured to detect respective amounts of the liquid collected by the respective openings; and
   one or more processors configured to:
     monitor, using the plurality of sensors, the liquid while the autonomous vehicle is driving;
     determine, based on the respective amounts of liquid detected by the plurality of sensors and a velocity of the autonomous vehicle, a direction of movement of the liquid, and cause, based on the direction of movement of the liquid, the autonomous vehicle to modify the velocity.

18. The autonomous vehicle of claim 17, wherein the one or more processors are configured to determine the direction of movement of the liquid by:

calculating a flow rate vector based on the respective amounts of liquid detected by the plurality of sensors and the velocity of the autonomous vehicle, wherein causing the autonomous vehicle to modify the velocity is based on the flow rate vector.

19. The autonomous vehicle of claim 17, wherein the directions of movement of the liquid are flow rate vectors.

20. The autonomous vehicle of claim 17, wherein the autonomous vehicle further comprises one or more heating elements configured to provide heat to the plurality of receptacles.

* * * * *